(12) United States Patent
Walter et al.

(10) Patent No.: US 9,389,417 B2
(45) Date of Patent: Jul. 12, 2016

(54) SCANNER DEVICE

(71) Applicant: Scansonic MI GmbH, Berlin (DE)

(72) Inventors: Steffen Walter, Berlin (DE); André Lange, Berlin (DE)

(73) Assignee: Scansonic MI GmbH, Berlin (DE)

( * ) Notice: Subject to any disclaimer, the term of this patent is extended or adjusted under 35 U.S.C. 154(b) by 0 days.

(21) Appl. No.: 14/785,632

(22) PCT Filed: Apr. 14, 2014

(86) PCT No.: PCT/DE2014/100128
§ 371 (c)(1),
(2) Date: Oct. 20, 2015

(87) PCT Pub. No.: WO2014/177133
PCT Pub. Date: Nov. 6, 2014

(65) Prior Publication Data
US 2016/0077331 A1  Mar. 17, 2016

(30) Foreign Application Priority Data
Apr. 30, 2013 (DE) .......................... 10 2013 104 410

(51) Int. Cl.
*G02B 26/08* (2006.01)
*G02B 26/10* (2006.01)
*H02K 33/16* (2006.01)

(52) U.S. Cl.
CPC .......... *G02B 26/105* (2013.01); *G02B 26/0816* (2013.01); *H02K 33/16* (2013.01)

(58) Field of Classification Search
CPC .. G02B 27/646; G02B 26/101; G02B 26/105; G02B 7/1821; G03B 2205/0069; H02K 33/16; H02K 35/02
USPC ............. 359/198.1, 199.1, 199.3, 200, 221.2, 359/200.1–200.3
See application file for complete search history.

(56) References Cited

U.S. PATENT DOCUMENTS

| 4,302,720 A | 11/1981 | Brill |
| 5,243,241 A | 9/1993 | Wang |
| 2010/0142018 A1 | 6/2010 | Shin |
| 2012/0105930 A1 | 5/2012 | Yamamoto et al. |
| 2012/0193428 A1 | 8/2012 | Bu |

FOREIGN PATENT DOCUMENTS

EP    2157467 A2    2/2010

*Primary Examiner* — James Phan
(74) *Attorney, Agent, or Firm* — Michael Soderman (57) ABSTRACT

The invention relates to a scanner device having a mirror arranged so as to be pivotable about an axis of rotation, an iron core with an air gap, a coil arranged about a portion of the iron core, and two permanent magnets. The two magnets have differently directed magnetizations and are arranged inside the air gap at different angular rotation positions with respect to the axis of rotation. An armature made of a soft-magnetic material is arranged on the mirror in such a manner that the armature is residing inside the air gap and, by means of application of electric current to the coil, the armature is moved toward one of the two magnets, depending on the direction of the current, and the mirror rotates.

13 Claims, 6 Drawing Sheets

SCANNER DEVICE

CROSS-REFERENCE TO RELATED APPLICATIONS

This application is the U.S. national stage of International Application No. PCT/DE2014/100128 filed on Apr. 14, 2014, and claims the benefit thereof. The international application claims the benefit under 35 USC 119 of German Application No. DE 102013104410.7 filed on Apr. 30, 2013; all applications are incorporated by reference herein in their entirety.

BACKGROUND

1. Field of the Invention

The invention relates to a scanner device for positioning a driven deflection mirror. The invention may be applied in the laser material processing e. g. for positioning a laser beam.

2. Description of the Related Art

Scanner devices or optical scanners are used to position light beams by deflection and e.g. to generate modulation pattern. An optical scanner may comprise a moving coil, a rotary magnet or a moving iron drive for repositioning the deflection mirror. Said mirror is mounted on a shaft and the shaft, and thus the mirror, is pivotable by means of the respective drive. It can, for example, be provided, to adjust and stabilize the rotation angle of the mirror by means of a feedback provided by an angle encoder, which, for example, is directly coupled to the shaft of the drive, and a corresponding control electronics.

Moving coil drives have a smaller moment of inertia compared to rotary magnet drives of the same torque constant due to a lower weight of the coil. Since the coil is surrounded by air, however, there is a poor heat dissipation from the coil to the environment, so that only a small permanent force can be generated. In addition, the supply of power is subject to wear and is accompanied by parasitic mechanical losses. In rotary magnet drives the coil may be in contact with a magnetic yoke, so that the heat generated by the coil can be dissipated via the magnetic yoke to the environment; however, the mass of the magnets is increasing when the producible torque shall be raised. On the other hand, moving iron drives utilize a soft iron element as a rotor, wherein the rotary movement of the soft iron element results in a change of the resistance within the magnetic circuit, which, for example, may be generated by a coil enclosing an iron core.

The U.S. Pat. No. 5,225,770 A for example discloses an optical scanner having a rotary magnet drive, which exerts forces on a permanent magnet rotor by means of fixed, in a soft iron yoke embedded coils, wherein at one end of the rotor, a mirror is mounted and at the other end of the rotor, a position detector is arranged.

In material processing by a laser beam, the used small beam diameter and the required short dwell times of the beam result in high demands on the positioning of the mirror and its speed of positioning, i. e. a fast and accurate repositioning of the deflection mirror from one angular position to another angular position is required. However, a fast and accurate repositioning of the deflection mirror requires a small torque of inertia (in comparison to the drive torque) as well as a stiff connection between drive and mirror, wherein in the case of optical scanner devices with a mirror mounted to a shaft, which is driven by a drive, the torque of inertia of the system to be moved by the shaft is determined by the mirror while the connecting rigidity is limited by the torsion of the torque-transmitting shaft.

SUMMARY

It is an objective of the invention to provide a scanner device with a mirror, by means of which a rapid and accurate repositioning of the mirror position is provided, while the scanner device can be realized with a flat and compact, and thus little interfering, contour.

DETAILED DESCRIPTION

According to the invention a scanner device and an optical scanner, respectively, are provided. The scanner device comprises at least one mirror, which is mounted in such a way that it is pivotable about a rotation axis. The scanner device further comprises at least one element of a soft magnetic material (hereinafter also referred to as the "armature element" or "armature"), which is fixed to the mirror at a radial distance to the rotation axis. Therefore, the armature is (pivotably) moved along with the rotation of the mirror sweeping over a circular path section. This armature may be box-shaped. It may be either arranged contacting the mirror directly or fixed by an appropriate intermediate element contacting the mirror indirectly.

The scanner device further comprises at least one iron core with an air gap, wherein the iron core can be designed either in one piece or in multiple parts. The iron core can, for example, be made from a soft magnetic material, e.g. soft iron or silicon iron. The scanner device further comprises at least one coil arranged around a portion of the iron core (hereinafter referred to as "coil section"). The coil may be made of insulated copper. The coil is chargeable with an electric current by means of a dedicated control device, wherein by means of the current flow a magnetic field (hereinafter also referred to as "coil magnetic field") in the coil, the iron core and the air gap is induced. The magnetic flux is converged, thus increasing the magnetic flux density of this magnetic field, and guided by the iron core.

Upon energizing the coil, i.e. charging the coil with an electric current, a magnetic field is induced in the iron core and the air gap, the orientation of this magnetic field depending on the direction of current flow in the coil. Upon charging the coil with a current of a first direction (by e. g. applying an electric voltage of a first polarity to the coil) a magnetic field having a first coil-field-direction is induced. Analogously, upon charging the coil with a current of a second, reversed to the first, flow direction (by e. g. applying an electric voltage of a second, to the first polarity reversed, polarity to the coil) a magnetic field having a second coil-field-direction is induced, wherein the second coil-field-direction is reversed with respect to (i. e. antiparallel to) the first coil-field-direction. In the following, the first and the second, respectively, coil-field-direction are always denoting the orientation of the magnetic field, which is induced by the coil within the air gap (and not within the iron core) when charging the coil with a current of a first and a second, respectively, flow direction.

The scanner device comprises at least one pair of permanent magnets, each pair having a first and a second permanent magnet. The first magnet has a magnetization extending in a first orientation of magnetization. The second magnet has a magnetization of a second orientation of magnetization, which is opposite to the first orientation of magnetization. Preferably, the magnets are made of a material with a high energy density, for example NdFeB.

The first and second magnets are arranged in the air gap of the iron core in a way that a component of the magnetization of the first magnet points in the direction of the first coil-field-direction and a component of the magnetization of the second magnet points in the direction of the second coil-field-direction. For that, the magnetization of the first and second magnets can be vectorially decomposed into a component (so-called parallel portion), which runs parallel to the magnetic field generated by the coil in the air gap, and a portion (so-called perpendicular portion), which runs perpendicular to the magnetic field generated by the coil in the air gap. The first magnet is arranged so that the parallel portion of its magnetization points in the direction of the first coil-field-direction, while the second magnet is arranged so that the parallel portion of its magnetization points in the direction of the second coil-field-direction.

It can be provided to arrange the first magnet in a way that its magnetization (substantially or entirely) points into the direction of the first coil-field-direction. It further can be provided to arrange the second magnet in a way that its magnetization (substantially or entirely) points into the direction of the second coil-field-direction. It further can be provided to construct and arrange the first and the second magnet in a way that the magnetization of the first magnet shows the same value as the magnetization of the second magnet. Furthermore, the magnetization of the first magnet may point in a direction opposite to the magnetization of the second magnet (i. e. the directions of magnetization of the first and the second magnet are antiparallel to each other).

The armature element is mounted on the mirror in a radial distance to the rotation axis, so that upon rotation of the mirror the armature element is moved along a circular path section. Moreover, the iron core is formed and arranged such that the circular path section swept by the armature element is residing within the air gap formed by the iron core. Thus, the armature element is moving within the air gap upon rotation of the mirror.

The first and the second magnet are arranged within the air gap such that the first magnet is disposed at a first rotational angular position with respect to the rotation axis and the second magnet at a second rotational angular position with respect to the rotation axis. The first and/or the second magnet may be contacting the iron core.

If the coil is energized (i. e. an electric current is directed through the windings of the coil) the coil induces a magnetic field within the air gap. This magnetic field induced by the coil is superimposed by the magnetic field, which is generated by the permanent magnets. In particular, the magnetic field in the air gap generated by the first permanent magnet is enhanced, if an electric current is running through the coil in the first direction, while the magnetic field generated by the second magnet is weakened. As a result, due to the resulting reluctance the armature element, which is made from soft magnetic material, moves to the first angular position, at which the first permanent magnet is disposed, by rotating the mirror. Analogous, if the coil is supplied with an electric current running in the second direction, the magnetic field generated by the first permanent is weakened due to super-position with the coil magnetic field of opposite direction, while the magnetic field of the second permanent magnet is enhanced in the air gap. Due to the resulting reluctance the armature element moves to the second angular position, at which the second permanent magnet is disposed, by rotating the mirror. Therefore, the mirror can be forced to a rotational movement and thus repositioned by adjusting the direction and the amplitude of the electric current in the coil.

According to the invention the mirror is driven pivoting by means of the force acting on one or more armature elements. Since the torque is transmitted to the mirror without any shaft, the drive may be designed shaftless. As a result, the accuracy in positioning the mirror is not affected by a torsion of a torque-transmitting shaft. Consequently, the positioning of a mirror by means of the scanner device is achieved with a high positioning accuracy. In addition, the pivot drive according to the invention is designed without the clamps at the rotor usually required with conventional reluctance drives. Instead, the flux-guiding portions of the rotor are separated by the segmentation air gap and associated with the pole shoe portion of the iron core.

In addition, those parts of the pivoting drive, which move along with the mirror, namely the armature element, can be designed with small dimensions thus exhibiting a small mass. Accordingly, the moment of inertia of the system being rotated by the drive is kept small and, therefore, the scanner device allows for a fast and low-inertia repositioning of the mirror. Furthermore, the scanner device may be designed as a compact device with a narrow contour along the rotation axis, since no shaft for transmission of torque extending along the rotation axis is required. A good ratio of torque to moment of inertia is achieved (i) by concentrating the magnetic flux due to the high permeability of the soft magnetic material used, (ii) by reducing parasitic masses as well as (iii) by placing the element the force is acting upon at the mirror.

In contrast, within common scanners (e. g. torque-transmitting shafts) the moving parts of the drive have a large mass, since they may be made of permanent magnetic material and/or the torque for rotating the mirror is generated by means of a lever of the drive, which is mounted to a bearing or a second armature element. This functional and spatial separation of the drive and the mirror results in a high level of inertia of the moving masses.

The air gap is formed between a first and a second end portion of the iron core, the second end portion of the iron core being located next to the armature element. In particular, it may be provided to arrange the magnets and the armature element in the air gap in such a way that the magnets are in contact to the first portion of the iron core and the armature element is arranged in-between the magnets and the second portion of the iron core. Thus, a partial gap between first magnet and armature element (also referred to as the "first working gap"), a partial gap between second magnet and armature element (hereinafter referred to as the "second working gap") and a partial gap between armature element and the second end portion of the iron core (hereinafter also referred to as "segmentation air gap") are formed. The segmentation air gap can be designed as slide bearing.

The coil section of the iron core may be arranged between the first end portion, which is located next to the permanent magnet, and the second end portion, which is located next to the armature element. Coil section, first end portion and second end portion may either be a separate component each, or two or all may be integrally formed as a single component. The second end portion of the iron core, which is located next to the armature element, may be shaped as a pole shoe for guiding the magnetic field lines, while the first end portion of the iron core, which is located next to the permanent magnet, serves as a magnetic yoke.

In order to achieve a better impact of force the dimension of the armature element tangential to the path of movement may be larger than the distance between the first and the second magnet along this direction. In addition, it can be provided to design the second end portion of the iron core, which is located next to the armature element, as a pole shoe with a constant radius in such a manner that during a rotational movement of the mirror, the distance between the second end portion of the iron core and the armature element remains constant. Since the segmentation air gap is extending along the direction of magnetic flow of the magnetic field generated by the coil, the armature element preferably has a length that no significant magnetic shunt between the magnet and the coil section is formed in parallel with the working gaps.

If no current flow is present in the coil and thus the armature element has a deflection angle of 0 degree (i. e. the armature element is centered with respect to the two magnets), a short magnetic circuit is formed (also called "bias circuit"), which runs between the two magnets via the armature element and the first end portion of the iron core. When an electric current flows in the coil, the magnetic field generated by the coil and the magnetic field of the permanent magnets are superposing within the working gaps and part of the magnetic flux of the bias circuit is rerouted through the armature element to the second end portion of the iron core. A resulting boundary surface force, which is caused by the difference in magnetic flux densities present in the two working gaps, exerts a torque on the armature element. Upon reversal of the electric current the direction of the torque effect reverses as well.

The force acting on the armature element due to the electric current flowing in the coil is effective in the working gaps, while only little or even no torque is acting on the armature element at the segmentation air gap, particularly, if the second end portion of the iron core is formed as a pole shoe with a constant radius. However, the radial position of the segmentation air gap affects the ratio of torque to moment of inertia. The moving parts of the drive system are limited to the armature elements, which are affixed to the mirror, wherein the biggest fraction of flux-conducting masses is stationary and will not move. Due to the achievable high flux concentration in the armature element high driving forces can be achieved at a low drive-caused inertia. By weight saving mounting of the armature to the mirror parasitic moments of inertia can be kept low.

Therefore, the scanner device substantially may consist of the drive system, a mirror, a holder for holding the mirror, a bearing for supporting the mirror and a position detector; said drive system comprising stationary components forming a stator (iron core, coil and permanent magnets) and moving components (one or more armature elements). It can be provided that the mirror (together with the armature element) and the mirror holder are designed exchangeable.

The position detector can be based on an optical, inductive, capacitive or magnetic functional principle and can be used in conjunction with an adequate control system for the coil or the drive system for controlled positioning of the mirror via evaluation of a captured position signal. The mirror-side components of the position detector can e. g. be affixed to the mirror or the mirror holder. In case of a contactless measuring position detector the mirror-side components as well may influence the mirror plane directly.

The scanner device is provided for deflecting light rays (e. g. laser beams), in particular for materials processing using a laser beam. The mirror is pivot-mounted by means of a holder on a bearing, thus being rotatable (about the rotation axis) relative to the stationary components of the drive system.

The first and the second coil-field-direction may be oriented (through appropriate design and arrangement of the iron core) e. g. perpendicular to the rotation axis, parallel to the rotation axis or at any angle to the rotation axis. Accordingly, the magnetization of the first and the second magnet may (through appropriate arrangement of the two magnets) be oriented perpendicular to the rotation axis, parallel to the rotation axis or at any angle to the rotation axis, wherein the arrangement of the magnets and the iron core is always such that the magnetization of the first magnet exhibits (at least) a component pointing in direction of the first coil-field-direction and the second magnet exhibits a magnetization with (at least) a component pointing in direction of the second coil-field-direction.

According to one embodiment, the first and the second permanent magnet are arranged such that the magnetizations of the first and second magnet are perpendicular (e. g. substantially radial) to the rotation axis. Additionally, it can be provided, that the iron core is formed in a way that the first and the second coil-field-direction are perpendicular (e. g. substantially radial) to the rotation axis as well. However, it can also be provided according to this embodiment, that (by appropriate design and arrangement of the iron core), the first and second coil-field-direction extend at an angle with respect to the rotation axis. According to this embodiment, both, the armature and the iron core may be positioned—seen along the rotation axis as the vertical direction—above and/or below the mirror, therefore not interfering with the incident and reflected light. Hence, large angles of incidence and exit for the light are made possible.

According to a further embodiment, the mirror is formed with a chamfered shape, that is with one or more chamfered edges or corners, wherein the armature element is arranged on a chamfer of the mirror, exhibiting e. g. a triangular-shaped cross section. By arranging the armature on a chamfer of the mirror, the volume not being lit by the light or laser beam may be used as space for the drive more effectively and the interfering contour may be kept small in the direction of the rotation axis. Therefore, a scanner device of a compact form is made possible.

According to a further embodiment, the scanner device comprises two (preferably identical) armature elements, which are attached to the mirror in a way that they are arranged symmetrically with respect to the rotation axis. Additionally, each armature element is assigned a pair of permanent magnets such that the respective armature element experiences a force to one of the two magnets of the assigned magnet pair when a coil is energized. By arranging the armature symmetrically with respect to the mirror, a symmetrical force action can be realized, reducing the radial load on the bearings and making possible a better use of space. It may be provided to mount any number of armature elements to the mirror, which are positioned symmetrically with respect to the rotation axis. For example, the scanner device may exhibit a plurality of pairs of armature elements, wherein each of these pairs comprises two (preferably identical) armature elements and wherein the two armature elements of each pair are attached to the mirror in a way that they are arranged symmetrically with respect to the rotation axis.

Alternatively or additionally, the scanner device may comprise two (preferably identical) armature elements, wherein these two armature elements are attached to the mirror in a way that they are arranged in mirror symmetry with respect to a plane extending perpendicular to the rotation axis. In this configuration, each of the two armature elements is assigned a respective pair of permanent magnets, such that the two armature elements experience a force directed towards one of the two magnets of the respective magnet pair when a coil is energized. By providing armatures symmetrically arranged with respect to the mirror, the mirror may be designed with a smaller thickness due to the two-sided force impact, which in turn enables higher positioning frequencies. It further may be provided to affix any number of armature elements to the mirror, which are arranged symmetrically with respect to a plane extending perpendicular to the rotation axis. For example it may be provided that the scanner device comprises a plurality of pairs of armature elements, each of the pairs comprising two (preferably identical) armature elements being fixed to the mirror in such a way that they are arranged symmetrically with respect to a plane extending perpendicular to the rotation axis.

It may be provided in particular that a plurality of armature elements are attached to the mirror such that the armature elements are arranged symmetrically with respect to the rotation axis as well as in mirror symmetry with respect to a plane extending perpendicular to the rotation axis. In this configuration, each of the armature elements is assigned a respective pair of permanent magnets, such that the armature element experiences a force directed towards one of the two magnets of the respective magnet pair when a coil is energized.

According to one embodiment, the scanner device comprises a coil being arranged concentrically with the rotation axis. By means of this embodiment in particular a symmetrical embodiment of the scanner device is made possible, wherein two or more armatures, which are arranged symmetrically with respect to the mirror, may be driven by a single coil.

It may also be provided that the scanner device comprises one or more coils being arranged off-centered with respect to the rotation axis. According to an embodiment the scanner device comprises (at least) two coils being arranged symmetrically with respect to the rotation axis. According to this embodiment each of the two coils may drive a respective armature element. In general it can be provided that the scanner device comprises an arbitrary number of armature elements mounted on the mirror and the same number of pairs of permanent magnets, each pair comprising a first and a second permanent magnet, wherein each of the armature elements is assigned a respective pair of permanent magnets, such that the respective armature element experiences a force directed towards one of the two magnets of the magnet pair when a coil is energized.

It can be provided that the first and/or the second permanent magnet comprises a pole shoe located at its side facing the armature and the rotor, respectively. By means of these pole shoes the effective radius of the rotor and, therefore, the ratio of moment of inertia to torque may be adapted according to the powered load, while retaining the shape of the coil.

The torque being exerted on the mirror via the armature element when charging the coil with an electric current may vary in dependence of the angular position of the mirror—for example, a nonlinear dependency may occur—wherein the dependency of the torque with respect to angular position of the mirror may be described using a torque-angle-characteristic. The pole shoes provided to the magnets may be shaped such that by means of changes in the course of the magnetic field caused by the shape of the pole shoes a nonlinearity occurring in accordance with the torque-angle characteristic is at least partially or even fully offset. Alternatively it can be provided to form the pole shoes such that by means of changes in the course of the magnetic field caused by the shape of the pole shoes an angular dependence of the torque is at least partially or even fully offset (so that the resulting torque e. g. is substantially independent of the angle).

In this regard, a pole shoe is a component made of a material of high permeability (e. g. iron), which serves to guide the magnetic lines (from e. g. a permanent magnet) according to its shape as well as to force the magnetic lines into a predefined form upon exiting. By compensating the nonlinearity in the torque-angle-characteristic or the angular dependence of the torque, positioning of the mirror is substantially facilitated.

The mirror is supported by a bearing or a mounting in such a way that it is pivotable about the rotation axis, wherein the mirror may be supported on one or on both of its sides with respect to the rotation axis. According to one embodiment the mirror is mounted on the iron core. By using the iron core as both, a driving element and an abutment for supporting the mirror, the compact design of the scanner device can be additionally promoted.

By applying the torque to the mirror via the armatures, particularly the transmission of torque from the rotor segment of the drive to the mirror can be realized shaftless, and the mirror can be mounted shaftless (i. e. no torque-transmitting shaft is required for supporting the mirror). It can, for example, be provided to mount the mirror by means of a mirror holder, the holder having a holding portion for holding the mirror, and an axle or an axle stub, said axle is formed as a circumferential or co-rotating axle and rotatable mounted on the iron core. Alternatively it can be provided to form an axle in the form of a static, non-rotatable shaft and to fix the axle to the iron core, wherein the mirror is mounted either directly or by means of a rotatable mounting on the axle. However, the axle has a mere supporting or bearing function, but does not serve for torque transmission from the drive to the mirror. The mirror itself can sort of serve as a lever for generating torque by supporting it using a bearing.

According to one embodiment the mirror is mounted pivotable about the rotation axis by means of a flexure hinge, wherein the flexure hinge preferably is a pivot bearing. Flexure hinges exhibit, compared to conventional galvanometer scanner with ball bearings, a significantly longer life cycle and a higher precision in moving and positioning the mirror. A flexure hinge allows a relative movement between two rigid bodies by means of elastic deflection so that by means of the flexure hinge a restoring torque may be supplied, which acts in countercurrent with a deflection of the mirror from its neutral or zero position.

Upon occurrence of the neutral position of the mirror, wherein an armature is centrally arranged between the two magnets, a bistable behavior of the mirror is given, with a small deflection of the mirror in the direction of one of the two magnets causing a further deflection in that direction. The flexure hinge may be designed such that the bistable behavior is compensated in the de-energized state for small positioning angles and the mirror is brought into its predetermined neutral position by means of the restoring torque provided by the flexure hinge, when no current is running through the coil.

In addition, it can be provided to form the flexure hinge such that by means of the restoring force provided by the flexure hinge a nonlinearity of the torque-angle characteristic (the torque-angle characteristic describing the variation of the torque, which is exerted by means of the coil via the armature to the mirror, in dependence of the angle of twist) is compensated at least partially (or even completely).

BRIEF DESCRIPTION OF THE DRAWINGS

Some diagrammatically shown embodiments of the invention will be described in more detail, by way of example, with references to FIGS. 1 to 11 of the drawings. In the drawings.

DETAILED DESCRIPTION OF THE PREFERRED EMBODIMENTS

With reference to FIGS. 1 to 4 and according to a first embodiment a scanner or an optical scanner device 1 includes a mirror 5 pivotally mounted to a swiveling or rotation axis 3. An armature 7 made from soft magnetic material is fixed to the mirror 5 at a radial distance to the rotation axis 3. Therefore, the armature 7 is being moved along a circular path section (in FIG. 2 denoted by the double arrow 9) when the mirror 5 rotates about the rotation axis 3.

The scanner 1 comprises an iron core 11 showing an air gap 13. The scanner 1 further comprises a coil 15, which is arranged around a portion 17 of the iron core (also referred to as coil section 17). The air gap 13 is formed between a first end portion 19 of the iron core 11, which acts as a magnetic yoke, and a second end portion 21 of the iron core 11, which acts as a pole piece. The iron core 11 thus consists of the first 19 and second 21 end portions and the interposed coil section 17, wherein these three portions may be formed either in each case as a separate component or two or all of these portions may be integrally formed as a single component. In the embodiment of FIGS. 1 to 4 the iron core 11 and the coil 15 in particular are designed such that the coil 15 is arranged concentrically with the rotation axis 3.

The scanner 1 also has a first permanent magnet 23 and a second permanent magnet 25, which are disposed in the air gap 13. The two magnets 23, 25 are arranged in contact to the magnetic yoke 19 of the iron core 11. The armature 7 is arranged within the air gap 13 between the second iron core end portion 21, which is formed as pole shoe with a constant radius, and the two magnets 23, 25 such that in the air gap 13 between the first magnet 23 and the armature 7 a first working gap 27, between the second magnet 25 and the armature 7 a second working gap 29, and a segmentation air gap 31 between the armature-sided second iron core end portion 21 and the armature 7 are formed.

Figure 3:
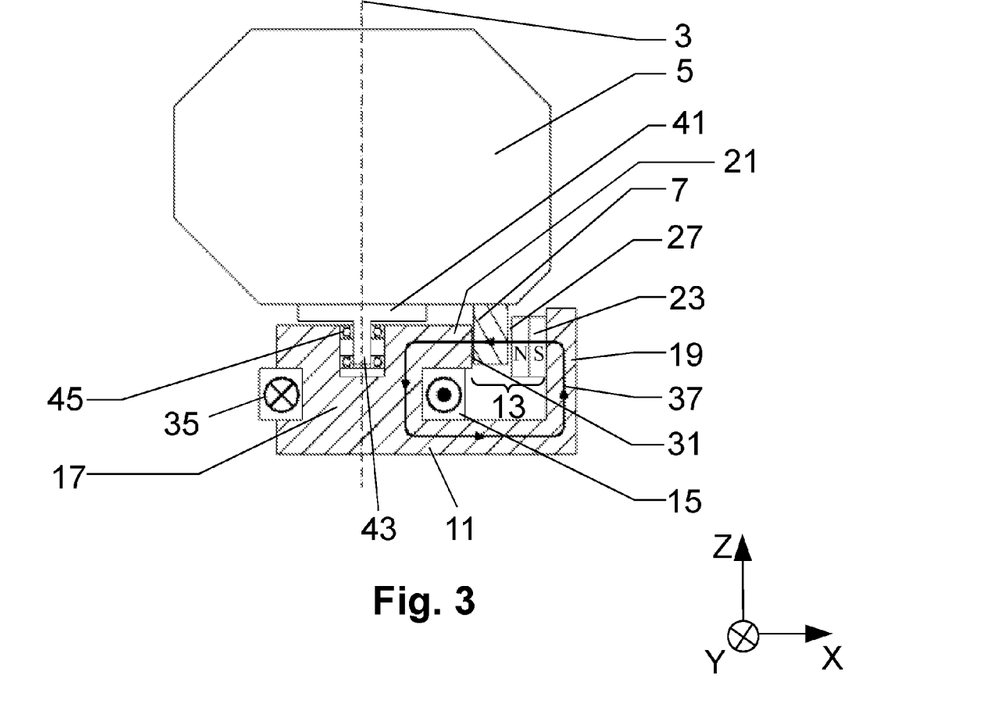
FIG. 3 shows a side sectional view of the scanner of FIG. 1 in the energized state, that is a current is flowing through the coil.

By energizing the coil 15, a magnetic field is induced in the iron core 11 and in the air gap 13, wherein the direction of the magnetic field depends on the current direction of the current running through the coil. FIG. 3 illustrates the scanner device 1 during energizing the coil 15 with a current of a first current direction 35, wherein a magnetic field is induced by the coil 15 (and wherein FIG. 3 shows a cross section through the first magnet 23 which is parallel to the x-z-plane). In applying an electric current of the first current direction 35 to the coil 15 a magnetic field is induced in the air gap 13, the magnetic field extending along a first coil-field-direction. According to FIG. 3 this first coil-field-direction represents the negative x-direction of the x-y-z-coordinate system shown in the figures. In applying an electric current of a second, the first current direction 35 opposing, current direction (not shown) to the coil 15, in an analogous way a magnetic field is induced in the air gap 13, the magnetic field extending along a second coil-field-direction. This second coil-field-direction represents the positive x-direction of the x-y-z-coordinate system. Here, the term "coil-field-direction" denotes the direction of the magnetic field, which is caused by the coil 15 in the air gap 13.

The magnetization direction of the magnets 23, 25 is indicated in the figures by specifying the north pole N and the south pole S of the respective magnets. The first magnet 23 is arranged such that its magnetization is pointing in the negative x direction, this direction being identical to the first coil-field-direction. The second magnet 25 is arranged such that its magnetization is pointing in the positive x-direction, which is identical to the second coil-field-direction.

The magnetization of the first 23 and second 25 magnets are equal in magnitude. The first 23 and the second magnet 25 are in particular arranged such that their magnetizations respectively are oriented perpendicular and substantially radial to the rotation axis 3.

The armature 7 is arranged at an end portion 11 of the mirror 5 facing towards the iron core 11. The iron core 11 is formed and arranged so that the circular path section swept by the armature 7 during a pivotal movement of the mirror 5 is located within the air gap 13. With respect to the rotation axis 3, the first magnet 23 is disposed at a first rotational angle position and the second magnet 25 at a second rotational angle position.

Figure 2:
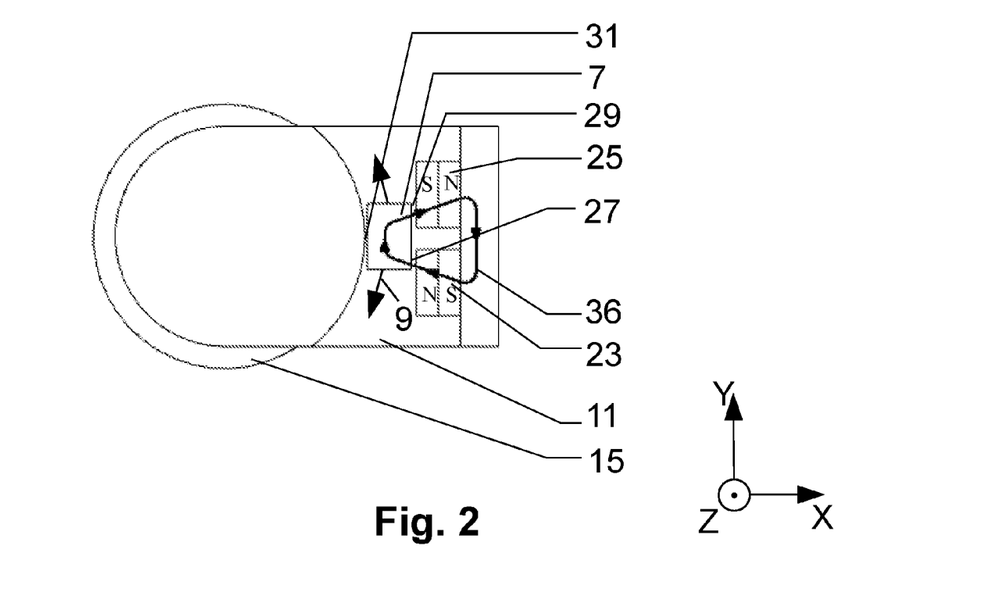
FIG. 2 shows a plan view of the scanner of FIG. 1 without a mirror and a mirror holder in the de-energized state.

FIG. 2 illustrates a top view of the scanner 1 in de-energized state; for clarity the mirror 5 is omitted. When the armature 7 is in its neutral position, that is in a rotational position in the center between the two magnets 23, 25—as shown in FIG. 2—and when the current in the coil equals zero, a bias circuit 36 is initiated due to the pre-magnetization of the permanent magnets 23, 25.

Figure 4:
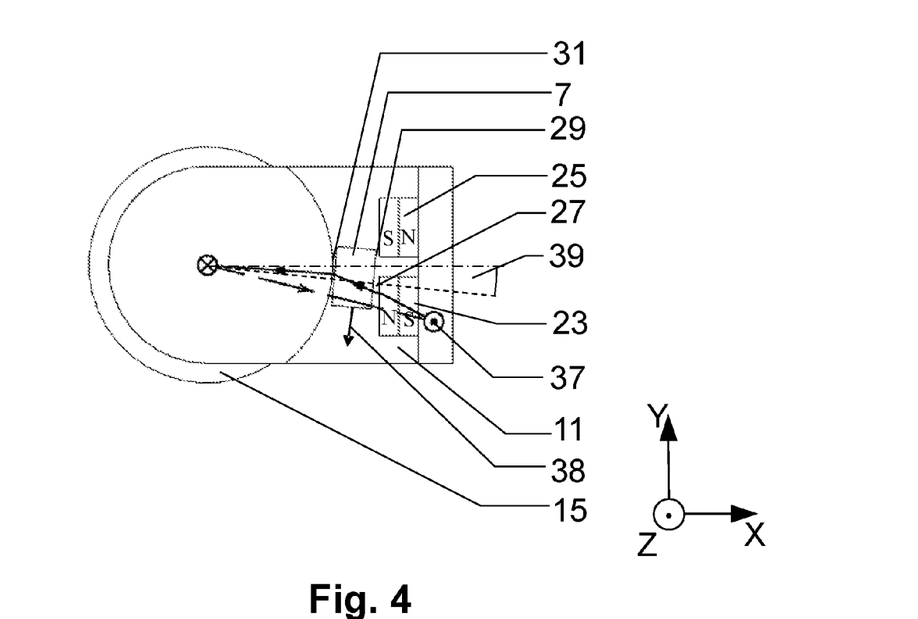
FIG. 4 shows a plan view of the scanner of FIG. 1 without a mirror and mirror holder in the presence of a current flow through the coil.

When an electric current is running through the coil 15, a driving magnetic circuit 37 is formed, which depends on the direction of the current running in the coil. The magnetic fields induced by the coil 15 and by the permanent magnets 23, 25 are superposed. FIGS. 3 and 4 illustrate the scanner 1 in case the current is running in the first current direction 35. With a current of the first current direction 35 the magnetic field generated by the coil 15 within the air gap 13 has the same direction as the magnetization of the first magnet 23 whereas it is directed opposite to the magnetization of the second magnet 25. Therefore, the magnetic field in the first working gap 27 is amplified while the magnetic field in the second working gap 29 is attenuated. Analog, when energizing the coil 15 with the second current direction (not shown) the magnetic field generated by the coil 15 within the air gap 13 is directed opposite to the magnetization of the first magnet 23 and has the same direction as the magnetization of the second magnet 25. Thus, the magnetic field in the first working gap 27 is attenuated while the magnetic field in the second working gap 29 is amplified. The main part of the magnetic flux of the driving magnetic circuit 37 thus extends in each case over those magnets whose magnetization direction coincides with the direction of the magnetic field generated by the coil 15 in the air gap 13.

With a deflection of the armature 7 from its neutral position toward one of the two working gaps 27, 29, the permeability of this working gap increases, whereas the permeability of the other working gap decreases. When energizing the coil 15 the armature 7 is always moved due to the resulting reluctance toward the region with the stronger magnetic field and the greater magnetic flux density, respectively, so by adjusting the direction and/or amperage of the current present in the coil 15 the mirror 5 can be taken to a predetermined angular position.

According to FIGS. 3 and 4, the coil 15 is exposed to the first current direction 35, so that by means of the reluctance force with the radial force vector 38 acting on the armature 7 said armature 7 is moved towards the first magnet 23 or the first working gap 27 with a corresponding rotation of the mirror 5 by a deflection angle 39. When the coil 15 is exposed to the second current direction, the armature 7 is moved due to the now resulting reluctance in the direction of the second magnet 25 and the second working gap 29, respectively.

Figure 1:
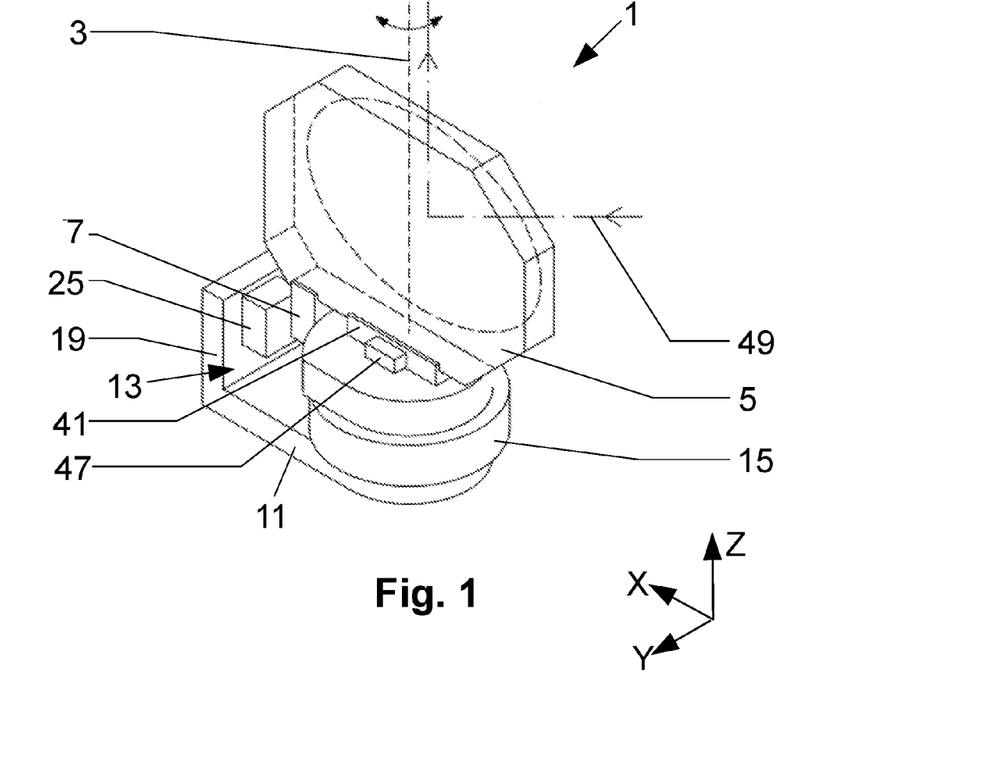
FIG. 1 shows an isometric view of an optical scanner according to a first embodiment with a single armature.

The scanner 1 according to the FIGS. 1 to 4 is pivotally mounted to the iron core 11 by a mirror holder 41, allowing for a rotation about the rotation axis 3. The mirror holder 41 has a holding portion for holding the mirror 5 and a stub axle 43 for supporting the mirror holder 41. The stub axle 43 is rotatable mounted on the iron core 11 by means of a bearing 45, the bearing 45 being designed as sliding or ball bearing. The mirror 5, therefore, particularly is designed shaftless, that is without a torque-transmitting shaft. The stub axle 43 merely serves as a bearing for the mirror 5. The scanner 1 additionally comprises a position detector 47 for detecting the rotational angular position of the mirror 5, wherein the position detector 47, for example, is fixed to the mirror holder 41. For illustration, a light beam reflected from the mirror 5 is shown in FIG. 1 in the form of a laser beam 49.

FIGS. 5 to 11 illustrate optical scanner according to other embodiments, wherein their operation is analogous to the operation described with reference to FIGS. 1 to 4 and, therefore, is not explained again below.

Figure 5:
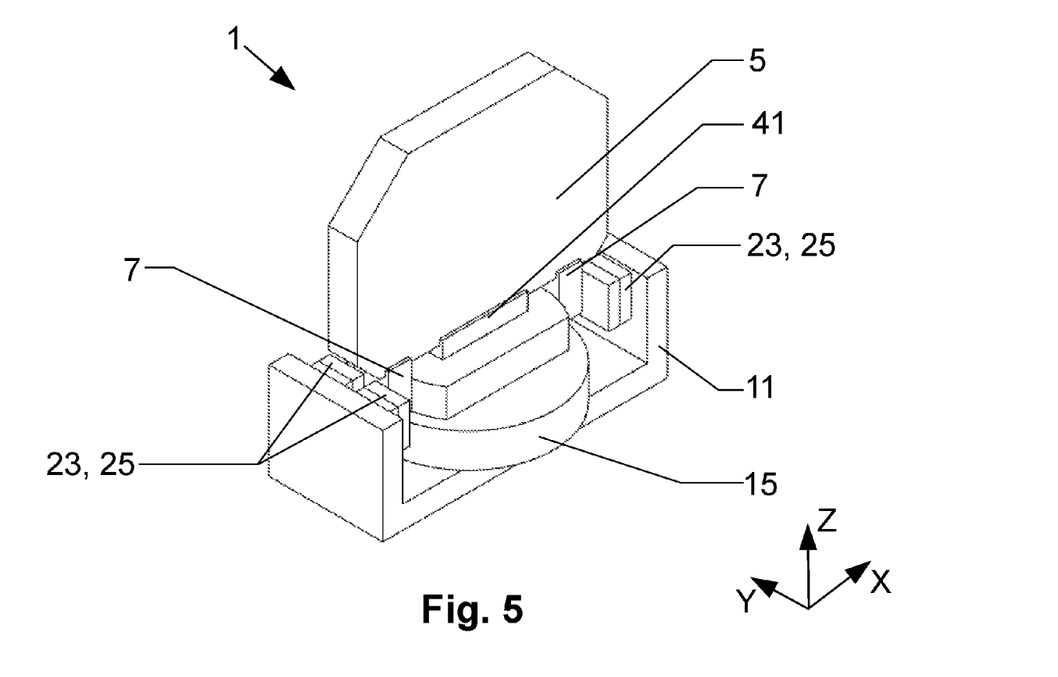
FIG. 5 shows an isometric view of an optical scanner according to a second embodiment with two armatures and a single coil.
Figure 6:
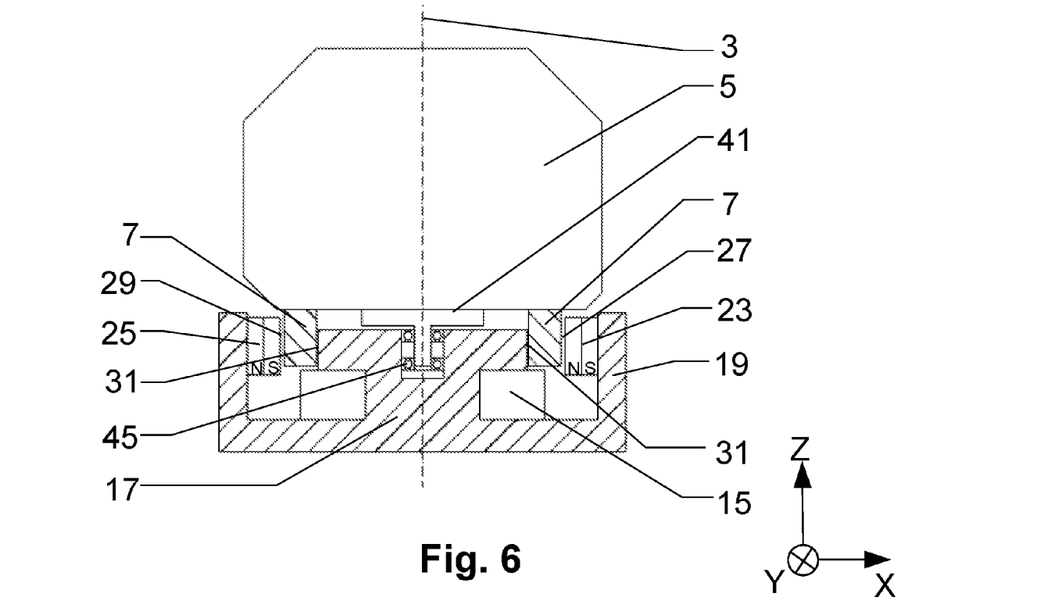
FIG. 6 shows a side sectional view of the scanner shown in FIG. 2.

FIGS. 5 and 6 illustrate an optical scanner 1 according to a second embodiment, which has, in contrast to the first embodiment, two identical armature elements 7, which are mounted in a radial distance from the rotation axis 3 of the mirror 5 in a symmetrical arrangement with respect to the rotation axis 3. Each of the two armatures 7 is associated a pair of permanent magnets with a first 23 and a second permanent magnet 25, wherein, according to the second embodiment, the torque generating magnetic field is generated by means of a single, common coil 15 arranged concentrically to the rotation axis 3. FIG. 6 illustrates a cross sectional view parallel to the x-z-plane.

Figure 7:
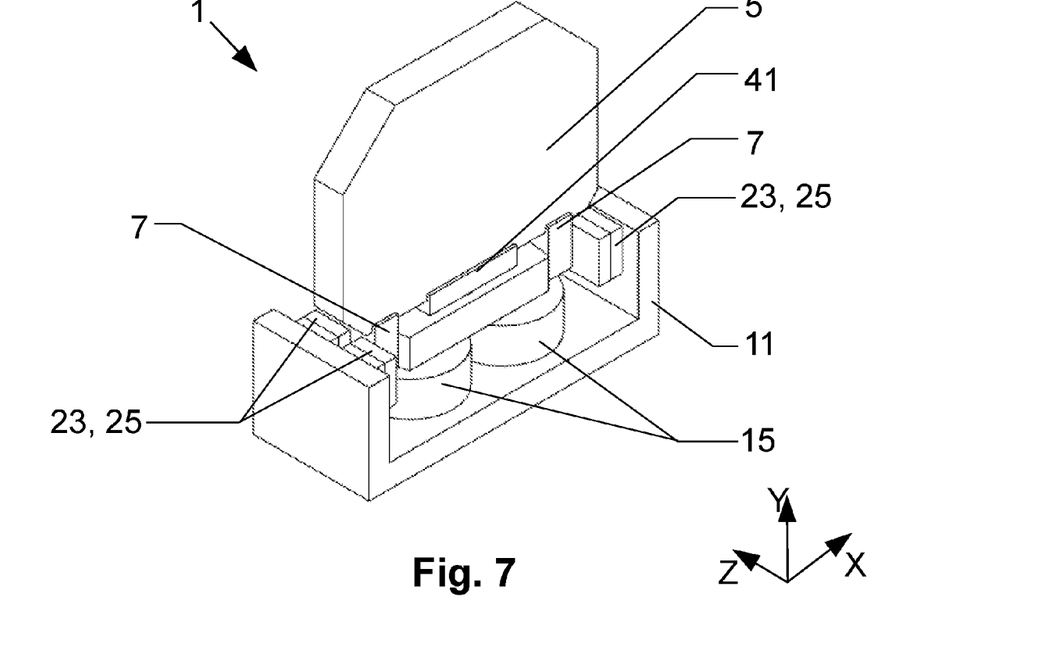
FIG. 7 shows an isometric view of an optical scanner according to a third embodiment with two armatures and two coils.
Figure 8:
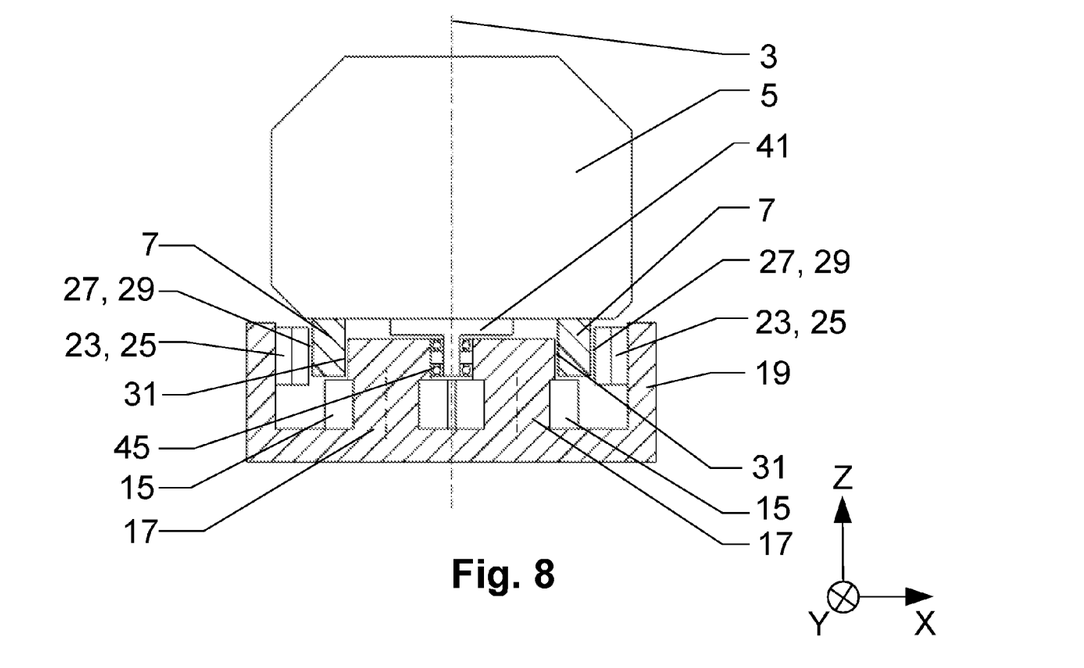
FIG. 8 shows a side sectional view of the scanner of FIG. 7.

FIGS. 7 and 8 illustrate an optical scanner 1 according to a third embodiment, which, in contrast to the first embodiment, comprises two identical armatures 7, which are arranged on the mirror 5 symmetrically with respect to the rotation axis 3. It further comprises two coils 15 arranged symmetrically (not concentric) with respect to the rotation axis 3. Each of the two armatures 7 is assigned a pair of permanent magnets 23, 25.

Figure 9:
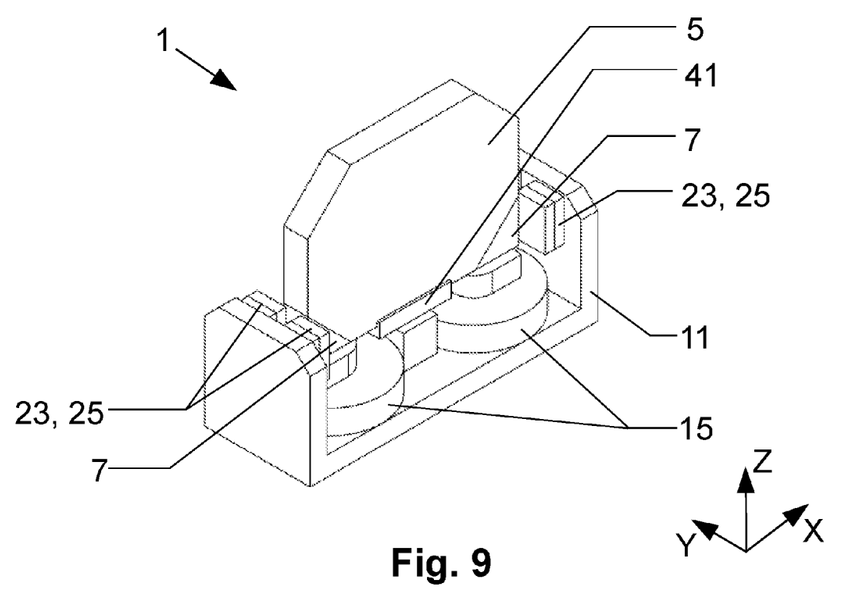
FIG. 9 shows an isometric view of an optical scanner according to a fourth embodiment with two armatures arranged on a chamfer of the mirror.
Figure 10:
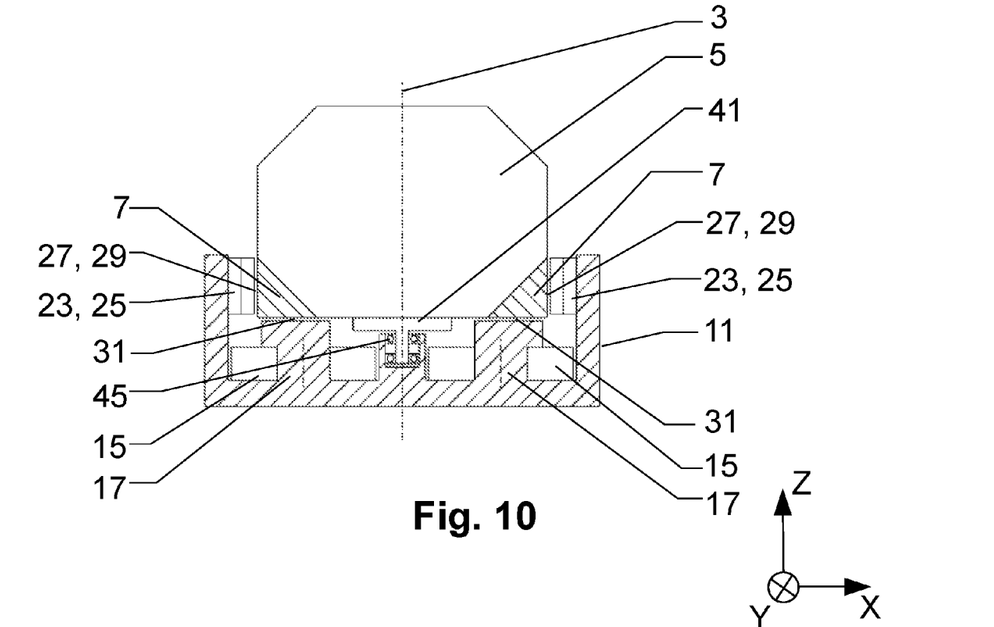
FIG. 10 shows a lateral section of the scanner depicted in FIG. 9.

FIGS. 9 and 10 illustrate an optical scanner 1 according to a fourth embodiment. Here, unlike the first embodiment, two armatures 7 are fixed to the mirror 5 at a respective chamfer (i.e. beveled surface). Each armature 7 exhibits a triangular cross section. According to this fourth embodiment, the segmentation air gaps 31 are extending in a perpendicular direction with respect to the rotation axis 3.

Figure 11:
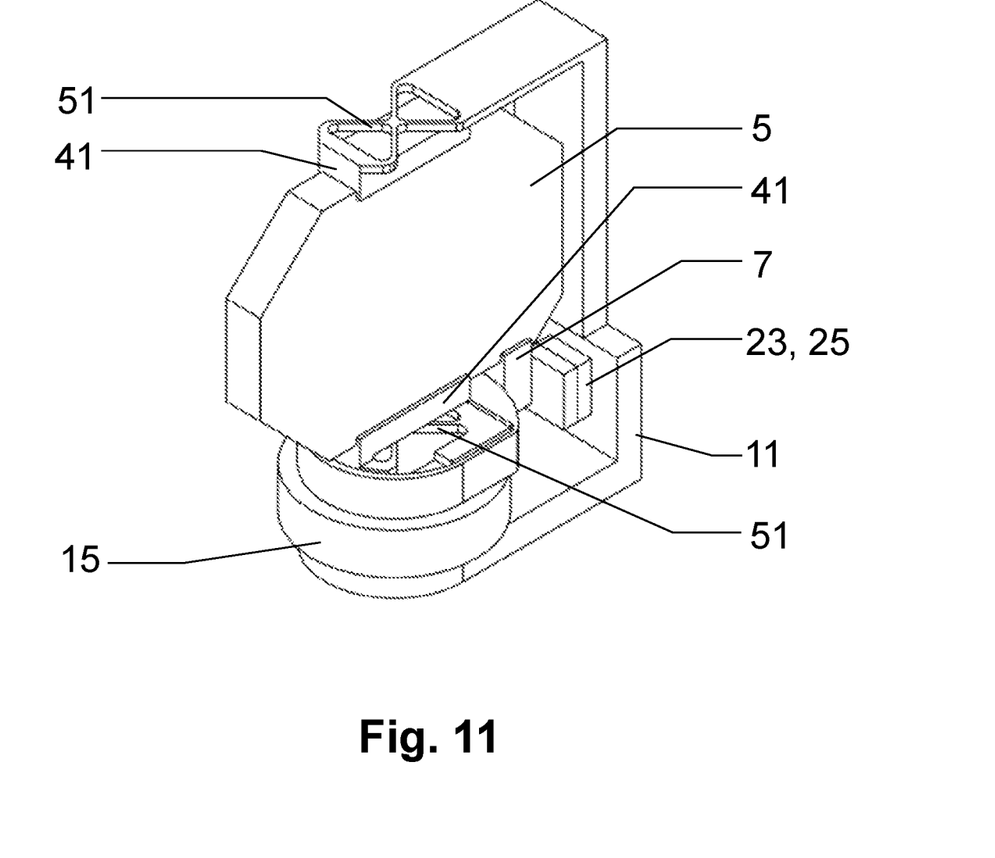
FIG. 11 shows an isometric view of an optical scanner according to a fifth embodiment with two flexure hinges as support.

FIG. 11 illustrates an optical scanner 1 according to a fifth embodiment, wherein the mirror 1 is mounted pivotally about the rotation axis 3 at its both sides by means of two flexure hinges 51. The flexure hinges 51 are designed such that the mirror 5 is being kept in its neutral position (i. e. an angular position centered between the two permanent magnets 23, 25) by means of the restoring torque provided by the flexure hinges 51 in the de-energized state (no current is running through the coil 15). That is, the flexure hinges 51 are designed such that their provided restoring force for small deflection angles compensates the force of attraction of the permanent magnets 23, 25 for an off-center position of the armature 7 so that the armature 7 in de-energized state is returned to its neutral position and held in its neutral position, respectively. The flexure hinges 51 additionally are designed that nonlinearities of the torque-angle-characteristic are being compensated by the restoring force provided by the flexure hinges 51.

LIST OF REFERENCE NUMERALS

1 Scanner device/optical scanner
3 Rotations axis
5 Mirror
7 Armature element/armature
9 Pivotal movement/circular path section swept by armature
11 Iron core
13 Air gap
15 Coil
17 Coil section of the iron core
19 First end portion of the iron core/magnetic yoke
21 Second end portion of the iron core/pole shoe portion
23 First permanent magnet
25 Second permanent magnet
27 First working gap
29 Second working gap
31 Segmentation air gap
35 First current direction
36 Bias circuit
37 Driving circuit
38 Radial force vector
39 Deflection angle
41 Mirror holder
43 Stub axle
45 Bearing
47 Position detector
49 Light beam/laser beam
51 Flexure hinge/pivot bearing

What is claimed is:

1. Scanner device, comprising:
a mirror mounted pivotally about a rotation axis, whereby an armature element of a soft magnetic material is mounted on the mirror in a radial distance to the rotation axis, so that upon rotation of the mirror the armature element sweeps over a circular path section,
an iron core with an air gap and a coil being arranged around a portion of said iron core so that upon charging the coil with an electric current of a first current direction a magnetic field with a first coil-field-direction and upon charging the coil with an electric current of a second, the first current direction opposing, current direction, a magnetic field with a second, the first opposing, coil-field-direction is induced in the air gap,
a first and a second permanent magnet are arranged in the air gap in such a way that a portion of the magnetization of the first permanent magnet is parallel to the direction of the first coil-field-direction and a portion of the magnetization of the second permanent magnet is parallel to the direction of the second coil-field-direction,
wherein the iron core is designed and arranged such that the circular path section swept by the armature element resides within the air gap, wherein the first permanent magnet is disposed within the air gap at a first rotational angle position and the second permanent magnet is disposed within the air gap at a second rotational angle position with respect to the rotation axis.

2. The scanner device of claim 1, wherein the first and the second permanent magnet are arranged such that the magnetization of the first and the second permanent magnet extends perpendicular to the rotation axis.

3. The scanner device of claim 1, wherein the mirror is a chamfered mirror and the armature element is attached to a chamfer of the mirror.

4. The scanner device of claim 1, comprising at least one pair of armature elements, each of said pair of armature elements exhibiting two armature elements, which are fixed to the mirror in such a way that they are arranged symmetrically with respect to the rotation axis.

5. The scanner device of claim 1, wherein the torque, which is being exerted on the mirror via the magnetic field generated by the coil, depends on the angular position of the mirror according to a torque-angle characteristic, and wherein the first and/or the second permanent magnet comprises a pole shoe, said pole shoe being of a shape, such that a change in the course of the magnetic field induced by said pole shoe at least partially compensates for a nonlinearity of the torque-angle characteristic.

6. The scanner device of claim 1, wherein the mirror is mounted pivotable about the rotation axis to the iron core.

7. The scanner device of claim 1, wherein the mirror is mounted pivotable about the rotation axis by means of a flexure hinge.

8. The scanner device of claim 7, wherein the flexure hinge is configured such that the mirror is brought into a predetermined neutral position by the restoring force provided by the flexure hinge when no electric current is running through the coil.

9. The scanner device of claim 7, wherein the torque being exerted on the mirror by the magnetic field generated by the coil depends on an angular position of the mirror according to a torque-angle characteristic, and wherein the flexure hinge is designed such that the restoring force provided by the flexure hinge at least partially compensates for a nonlinearity of the torque-angle characteristic.

10. The scanner device of claim 1, wherein the mirror is mounted shaftless.

11. The scanner device of claim 1, wherein the coil is arranged concentrically to the rotation axis.

12. The scanner device of claim 1, comprising at least two coils, which are arranged symmetrically with respect to the rotation axis.

13. The scanner device of claim 1, comprising at least one pair of armature elements with two armature elements, wherein each armature element of the pair of armature elements is fixed to the mirror in such a way, that said armature elements are arranged symmetrically with respect to a plane extending perpendicular to the rotation axis.

* * * * *